United States Patent [19]
Leach et al.

[11] Patent Number: 5,870,276
[45] Date of Patent: Feb. 9, 1999

[54] ELECTRICAL POWER DISTRIBUTION DEVICE WITH ELEVATED REMOVABLE LOAD CENTER

[75] Inventors: Thomas C. Leach, Lexington; Larry D. Polston, Nicholasville; Gary D. Fornash, Lexington, all of Ky.

[73] Assignee: Square D Company, Palatine, Ill.

[21] Appl. No.: 455,119

[22] Filed: May 31, 1995

[51] Int. Cl.⁶ ................................................ H02B 1/01
[52] U.S. Cl. ...................... 361/627; 361/641; 361/644; 361/660; 361/825
[58] Field of Search .................... 361/622, 627, 361/634, 636, 641, 643–645, 647, 657–660, 664, 666, 673, 676, 825–826

[56] References Cited

U.S. PATENT DOCUMENTS

| | | | |
|---|---|---|---|
| 3,458,768 | 7/1969 | Schubert | 361/641 |
| 3,707,652 | 12/1972 | Coffey et al. | 317/120 |
| 3,707,653 | 12/1972 | Coffey et al. | 317/120 |
| 3,783,343 | 1/1974 | Byland | 317/107 |
| 3,832,604 | 8/1974 | Goodridge | 361/644 |
| 3,858,091 | 12/1974 | Wilkinson | 317/120 |
| 3,906,295 | 9/1975 | Tessmer | 317/107 |
| 3,949,277 | 4/1976 | Yosset | 317/120 |
| 4,443,654 | 4/1984 | Flachbarth et al. | 174/78 |
| 4,532,574 | 7/1985 | Reiner et al. | 361/365 |
| 4,623,859 | 11/1986 | Erickson et al. | 335/14 |
| 4,796,844 | 1/1989 | Barker | 248/222.2 |
| 4,920,476 | 4/1990 | Brodsky et al. | 364/140 |
| 5,180,051 | 1/1993 | Cook et al. | 200/400 |
| 5,301,083 | 4/1994 | Grass et al. | 361/64 |
| 5,404,266 | 4/1995 | Orchard et al. | 361/667 |
| 5,418,683 | 5/1995 | Orchard et al. | 361/672 |

*Primary Examiner*—Gregory D. Thompson
*Attorney, Agent, or Firm*—Larry I. Golden; Kareem M. Irafai

[57] ABSTRACT

The invention provides a combination service entrance device which contains a common enclosure, divided by a center barrier into two sections. One houses a watt-hour meter socket and the other houses a panel board containing circuit breakers. The panel board is installed on an elevated mounting pan placed in the circuit breaker section. One side of the mounting panel preferably has a pair of tabs, each of which slides into a separate lance or guide formed in the center barrier. A pair of spaced posts are attached between the side opposite the barrier and the back panel of the enclosure. The length of the posts defines the gap between the back panel and the panel board. An elevated neutral bar is attached to the back panel along and distant from the mounting panel. The panel board remains parallel to and raised from the back panel. The elevated mounting pan provides for routing wires in the circuit breaker section and easier access to the load connections of the circuit breakers compared to prior art devices. This reduces installation time and potential scratching of the installer's hands, something that frequently occurs in prior art devices. The panel board is easier to install and remove compared to the prior art devices. The elevated mounting panel allows for better air circulation underneath the panel board. Mounting provisions may be provided on the common enclosure for surface-mounting or semi-flush-mounting of the combination service entrance.

16 Claims, 6 Drawing Sheets

ELECTRICAL POWER DISTRIBUTION DEVICE WITH ELEVATED REMOVABLE LOAD CENTER

BACKGROUND OF THE INVENTION

1. Field of the Invention

This invention relates generally to electrical power distribution apparatus and more particularly to a combination service entrance device having an elevated removable load center that provides space for routing wires between the enclosure and the load center and further provides more efficient air circulation in the load center section compared to the prior art devices.

2. Description of the Related Art

Combination service entrance devices having a common enclosure for housing a utility meter socket, and a load center or panel board having one or more service disconnects and a plurality of branch circuit breakers have been gaining commercial use, particularly for use in residential dwellings. The term "combination" refers to the fact that the unit encloses both the mounting provisions for a utility-company watt-hour meter ("meter") and a panel board containing circuit breakers for the distribution, control and protection of various circuits in a building.

Utility companies require that utility meter section of any such combination service entrance device be separated and sealed from the "customer's" side, i.e., the circuit breakers. Therefore, the manufacturers of such devices place a solid barrier at or near the center of the common enclosure to provide two sections or compartments: one sealed compartment for housing the meter socket and the other an unsealed compartment for housing the panel board. In order to provide access to the meter by the utility companies, the combination service entrance devices are usually installed on the outside.

In prior art devices, the panel board, which contains one or more service disconnects and a plurality of branch circuit breakers, is usually placed near the back panel of the common enclosure, which leaves a large empty space between the panel board and a cover or door placed on the panel board section. Electrical conductors carrying main power from the meter socket are routed across the wire way, which obstructs the load wiring and requires routing of the load wires either over or under the line side main power connectors, which always are electrically live. Wires and cables connected between the circuit breakers and their respective loads are placed around the panel board.

In many applications the electrician connecting the circuit breakers in the combination unit to the various loads must pull a large quantity of wires within and through the load center where the main service enters the building and the branch circuit breakers are distributed. When a large number of wires must be pulled, the load center interior installed at the back of the panel board section of the combination device inhibits routing of such wires. It also forces the electrician to route some of the wires over electrically live connectors. Although such connectors are insulated, it is more desirable to run all wires away from any live connectors.

The lack of wiring space, especially behind the panel board, exposes the panel board components to potential damage. Also, technicians installing the service sometimes suffer cuts and bruises on their hands. Since the panel board is installed on the back of the panel board section of the common enclosure, all the wires must be routed around the interior and all the space above the panel board is wasted. Also, some technicians prefer to first remove the panel board from the enclosure, pull wires into the enclosure and then install the panel board when they are ready to make connections to the circuit breakers. However, the panel boards in the currently available combination service entrance devices are difficult to remove and re-install.

Accordingly, a need exists for a combination service entrance device which more efficiently utilizes the space within the panel board section of the enclosure, provides more space for routing the wires underneath the panel board, is configured to provide relatively easier routing of wires in the panel board section and in which the panel board may be easily removed and re-installed in the field.

The present invention addresses the above-noted deficiencies of the prior art combination service entrance units and provides an improved combination service entrance device which more efficiently utilizes the space within the panel board section of the enclosure, provides more space for routing the wires and is configured to provide relatively easier routing of wires in the panel board section and enables electricians to relatively easily remove and re-install the panel board in the field.

SUMMARY OF THE INVENTION

The present invention provides a combination service entrance device which contains a common enclosure that is divided by a center barrier into a first section for housing a watt-hour meter socket and a second section for housing a panel board containing circuit breakers. The panel board is installed on an elevated mounting pan placed in the circuit breaker section so that the circuit breakers will remain within and near a door placed on the outside of the circuit breaker section. One side of the mounting panel preferably has attached thereto a pair of tabs, each of which is adapted to be interlocked with a separate lance or guide formed in the center barrier. A pair of spaced posts are attached between the back panel and the other side of the mounting pan. The length of the posts defines the gap between the back panel and the panel board. An elevated neutral bar is placed within the circuit breaker section spaced from and along the mounting pan. In this configuration, the panel board remains substantially parallel to and raised from the back panel. The elevated mounting pan provides additional space for routing wires in the circuit breaker section and easier access to the load connections of the circuit breakers compared to the devices wherein the panel board is placed on or very near the back panel. This system saves installation time and reduces possible scratching of the installer's hands, which frequently occurs when there is little space between the back panel of the enclosure and the panel board. Due to the use of interlocking tabs and a pair of screws, the panel board is easier to install and remove compared to the prior art devices. Additionally, the elevated mounting panel allows for better air circulation underneath the panel board. Mounting provisions may be provided on the common enclosure for surface-mounting or semi-flush-mounting of the combination service entrance device.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention references should be made to the following detailed description of the preferred embodiment taken in conjunction with the accompanying drawings, in which like elements have been given like numerals and wherein.

DESCRIPTION OF THE PREFERRED EMBODIMENTS

Figure 1:
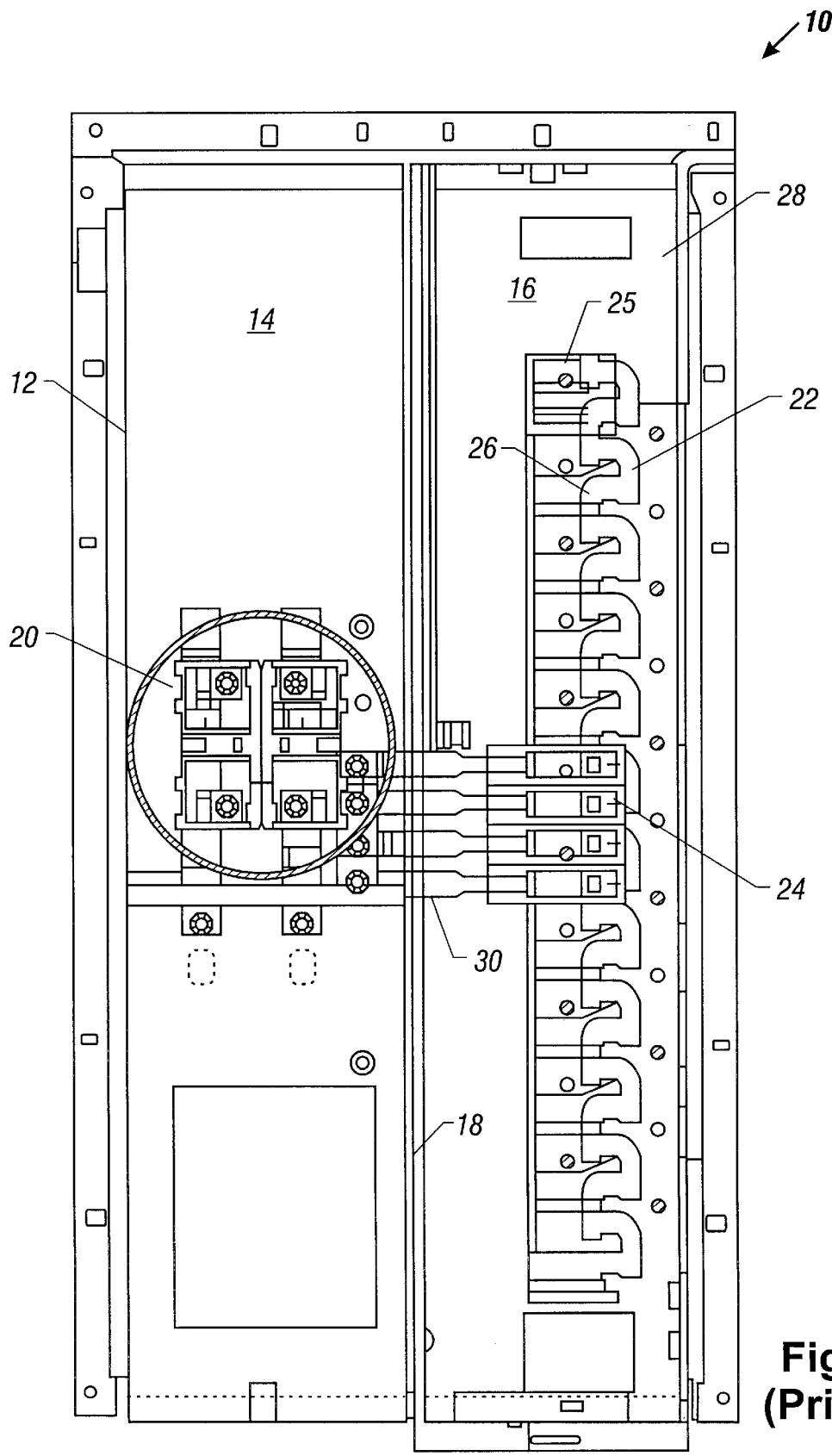
FIG. 1 shows the front interior of a prior art combination service entrance device wherein a panel board and branch neutral are installed on the back panel of the common enclosure.

FIG. 1 shows the front interior of a typical prior art side-by-side combination service entrance device 10 having a common enclosure 12 that is partitioned by a solid center barrier 18 into a utility section 14 and a panel board section 16. The center barrier 18 is usually placed at or near the center of the common enclosure 12 and runs vertically the entire height of the common enclosure 12. A watt-hour meter socket 20 is placed within the utility section 14. A watt-hour meter (not shown) is coupled to the watt-hour meter socket for measuring the consumption of electric power. A panel board 22 having thereon a main circuit breaker (service disconnect) 24 and a plurality of branch circuit breaker sockets 26 are placed on the back panel 16 of the common enclosure 12. In some applications additional or auxiliary service disconnects, such as shown by service disconnect 25, are utilized. Electrical conductors 30 carrying power from the watt-hour meter socket 20 are run from the utility section 14 via a through-passage (not shown) formed in the center barrier 18 and across the branch wire way 22 to the service disconnects 24 and 25.

Figure 2:
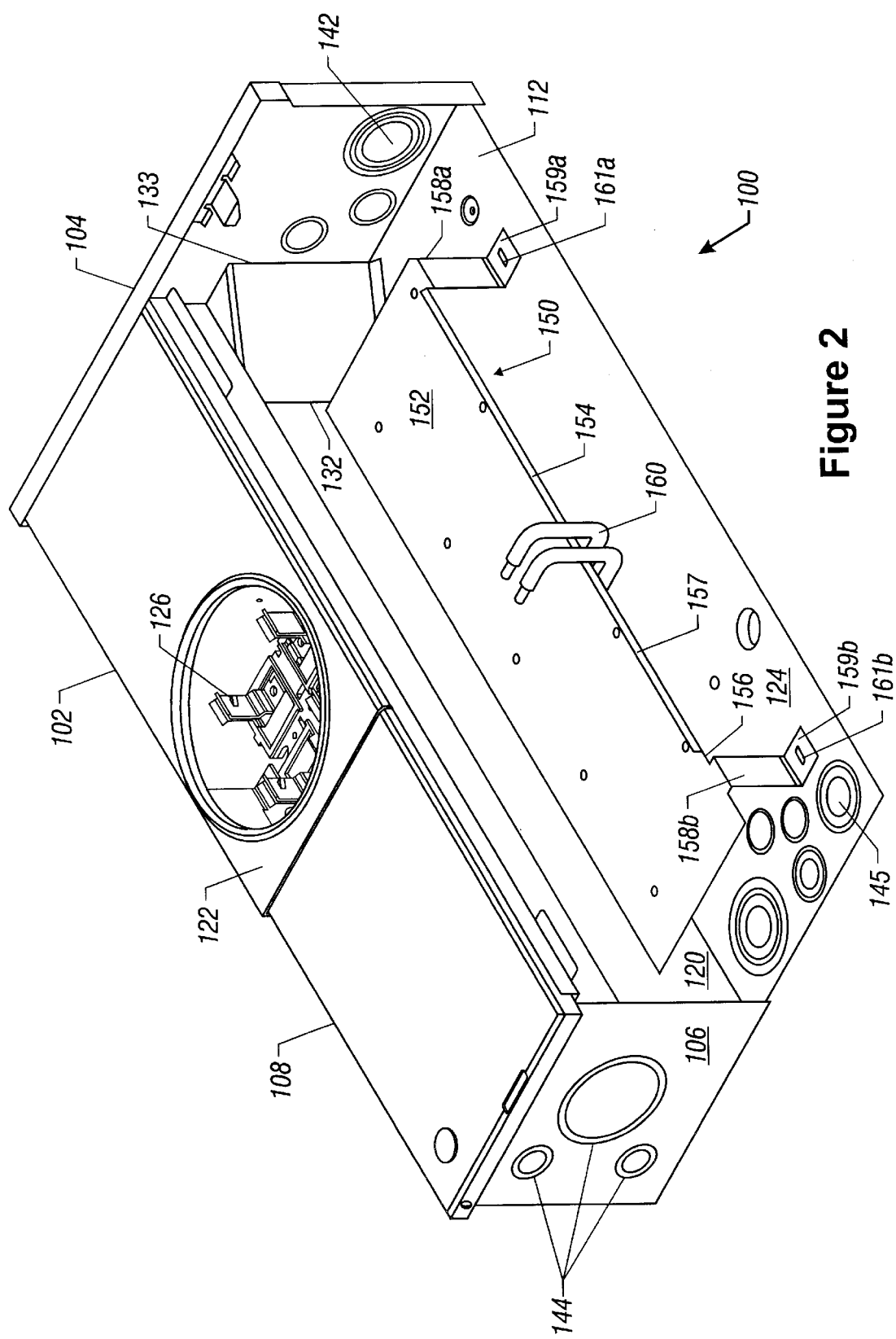
FIG. 2 shows a partial isometric view of a combination service entrance device with an elevated panel board mounting pan according to the present invention.
Figure 3:
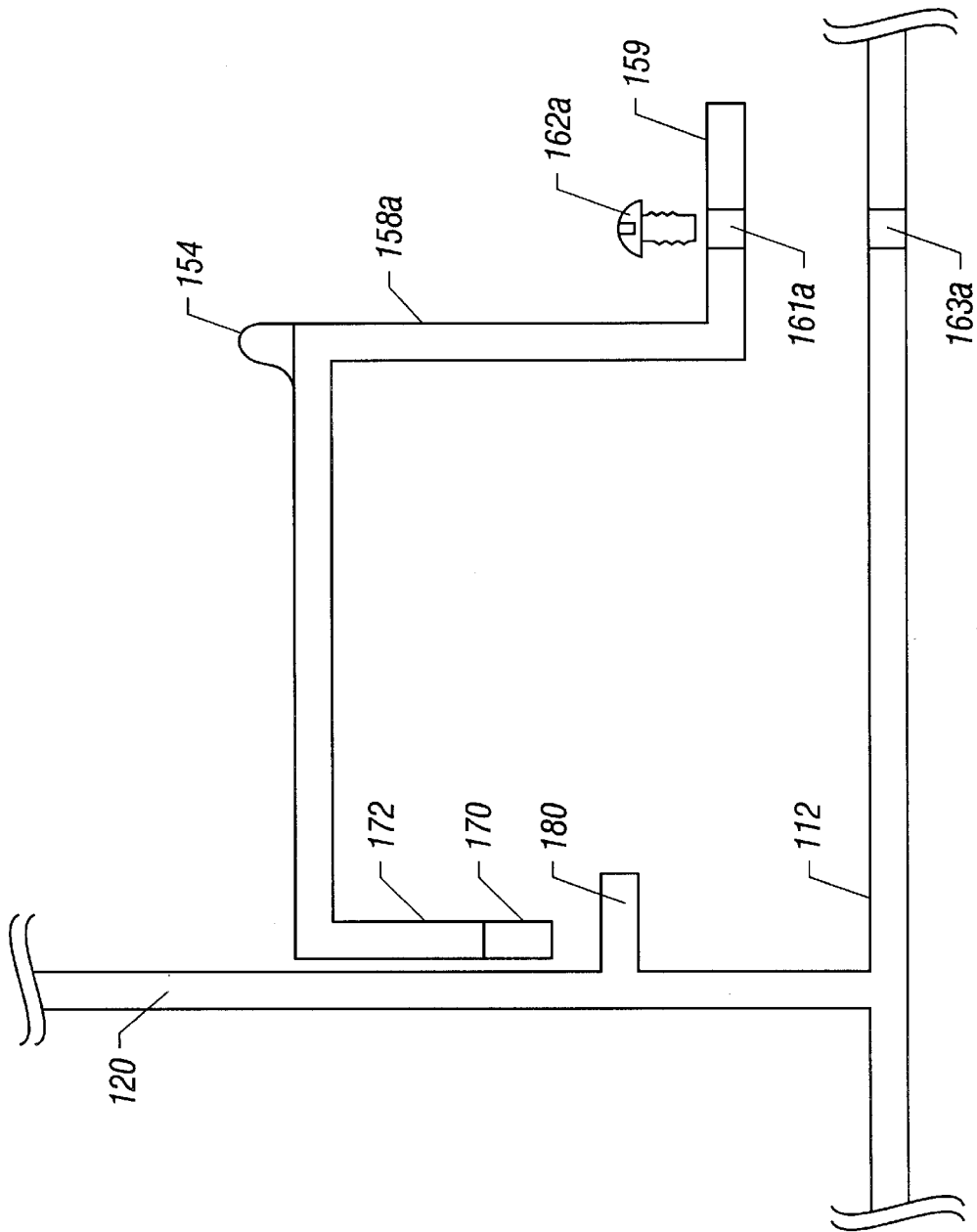
FIG. 3 shows a side view of the manner of placing the panel board mounting pan shown in FIG. 2 in the panel board section of the combination service entrance device.

FIGS. 2 through FIG. 6 show the preferred embodiment of the combination service entrance device 100 according to the present invention. FIG. 2 is a partial isometric view of the combination device 100. The combination device 100 preferably contains a unitary box-like (rectangular) common enclosure 102 having a top panel 104, bottom panel 106 (partially shown), left side panel 108, right side panel 110 (not shown), and back panel 112. The common enclosure 102 preferably is made from a suitable metal which may be treated with a corrosion resistant zinc finish and electrostatically deposited painted surface to provide protection from the outside environment. A solid center barrier 120 divides the common enclosure 102 into a utility compartment or section 122 for housing therein a watt-hour meter socket 126 and a customer compartment or section 124 for housing therein an improved configuration of a panel board, which will now be described in detail.

As noted earlier, utility companies require that the utility section, such as section 122, of any combination service entry device be separated and sealed from the customer section, such as section 124. To segregate and seal the utility section 122 from the customer section 124 and to incorporate provisions for mounting a center-mounted hub (not shown) on the top panel 104, the solid center barrier 120 is fixedly placed straight inside the common enclosure 102 from the inside of the bottom panel 106 of the common enclosure 102 up to a convenient point 132 and is then placed at a suitable angle toward the customer section 124. That is, the top section of the barrier 120 is offset and it encroaches into the top section of the customer section 124 up to a point 133 on the top panel 104 so as to provide sufficient space at the center of the top panel 104 for mounting a center conduit-hub (not shown) through which line cables may be brought into the meter socket section 122 without the use of any external offset device, as is usually required by the prior art combination service entrance units. Knock-out holes, generally designated herein by numeral 142, are provided in the top panel 104 for installing thereat a center-line hub and for running wires and cables to and from the combination device 100.

Knock-out holes, generally designated herein by numeral 144, are provided at the bottom panel 106 for bringing line cables into the utility section 122 from the bottom panel 106 and for running other wires and cables to and from the combination device 100. Additionally, knock-out holes, generally designated herein by numeral 145, may be provided in the back panel 112 for providing access to the customer section 124. Mounting provisions may be provided on the back panel for surface-mounting or -semi-flush-mounting of the combination service entrance.

Still referring to FIG. 2, an elevated panel board mounting pan 150 is placed on the back panel 112 in the panel board section 124. Electrical conductors 160 carrying power from the meter socket 126 are routed from the utility section 122 into the panel board section 124 underneath the panel board pan 150 to positions where the circuit disconnects will be located.

The preferred configuration of the panel board mounting pan, the placement of a panel board thereon and mounting of the panel board assembly in the panel board section 124 will now be described while referring to FIGS. 2 through FIG. 5. The panel board mounting pan contains a substantially flat rectangular surface 152 that is adapted to accommodate thereon different sizes of panel boards that are expected to be utilized in the combination device 100. A pair of tabs 170 (FIG. 3 ) are formed either on a left side (first side) 172 that is perpendicular to the flat side 152 or directly on the left edge 155 of the mounting pan 150. A pair of spaced posts 158a and 158b, which may be separate members attached to the mounting pan 150 or formed integral thereto as shown in FIG. 2. Posts 158a and 158b respectively have a flat base or foot 159a and 159b, each base respectively having a hole 161a and 161b for placing a screw therethrough. A lance or guide 180 (FIGS. 3,4 and 5) is formed in the center barrier 120 corresponding to the position of each of the tabs 170. A lip 154, facing away from the back panel, is formed along the length of the right edge 156 of the mounting pan 150 to protect wires from abrasion when they are pulled underneath the mounting pan 150. The mounting pan 150 may be made from any suitable material such as steel, aluminum, stainless steel or plastic. The mounting pan 150 and load center insulating material may be made as one unit, such as by molding a suitable material, such as plastic, to form a unitary member having design features of both the parts.

Figure 5:
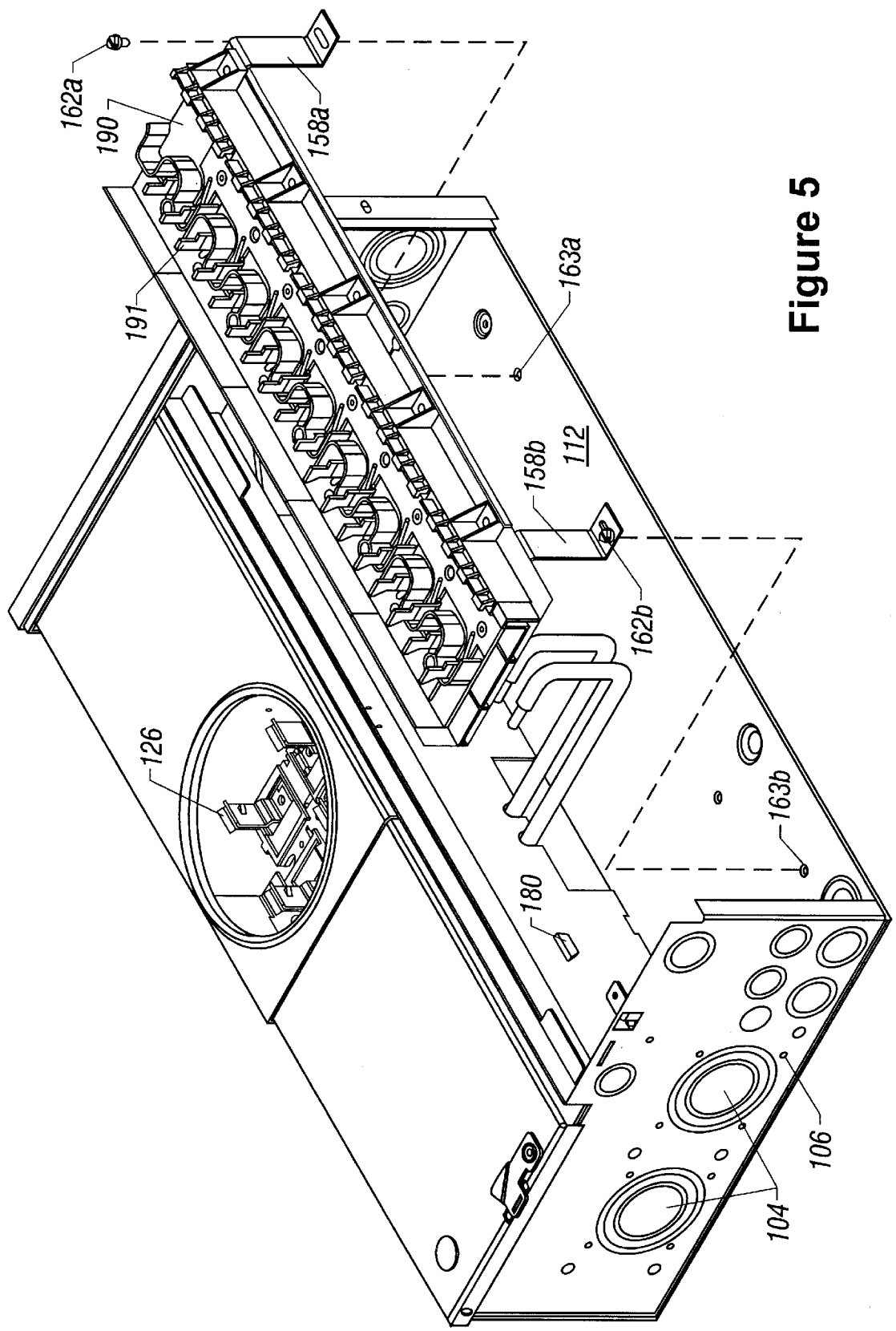
FIG. 5 shows a partial isometric view of the combination service entrance device with the panel board installed on the panel board mounting pan.

Referring to FIG. 5, a panel board 190 having a number of circuit breaker sockets 191 is attached on the mounting pan 190 by suitable means, such as screws placed in matching holes placed in the panel board 190 and the mounting pan 150. The interlocking tabs 170 of the mounting pan 150 are slid in their corresponding associated lances 180 and the posts 158a and 158b are attached to the back panel 112 by screws 162a and 162b placed through the holes 161a and 161b and corresponding holes 163a and 163b formed in the back panel.

Figure 4:
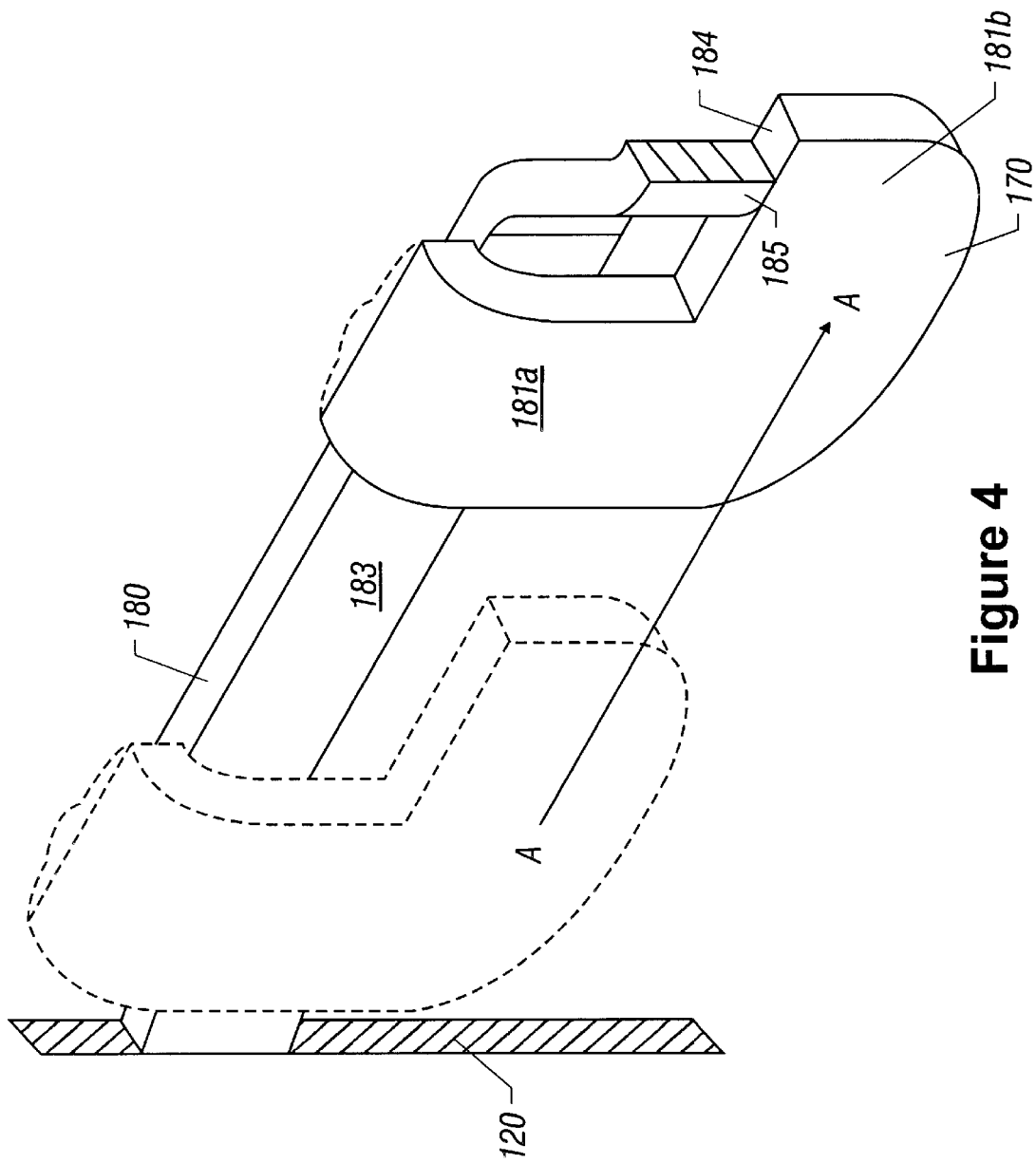
FIG. 4 shows the placement of an interlocking tab of the panel board mounting pan in a lance formed in the center barrier of the common enclosure of the combination service entrance device of FIG. 2.

FIG.4 shows a preferred shape of the tab 170 and the manner of placing the tab in the lance 180. The tab 170 is preferably "L" shaped having a vertical member 181a and horizontal member 181b. The lance 180 has a longitudinal opening 183 which is longer than the length of the horizontal side 181b. Tab 170 is placed in the lance 180 and moved in the direction shown by arrow AA, until the inside surface 184 of the horizontal member 181b is underneath a protruded end 185 of the lance 180.

Figure 6:
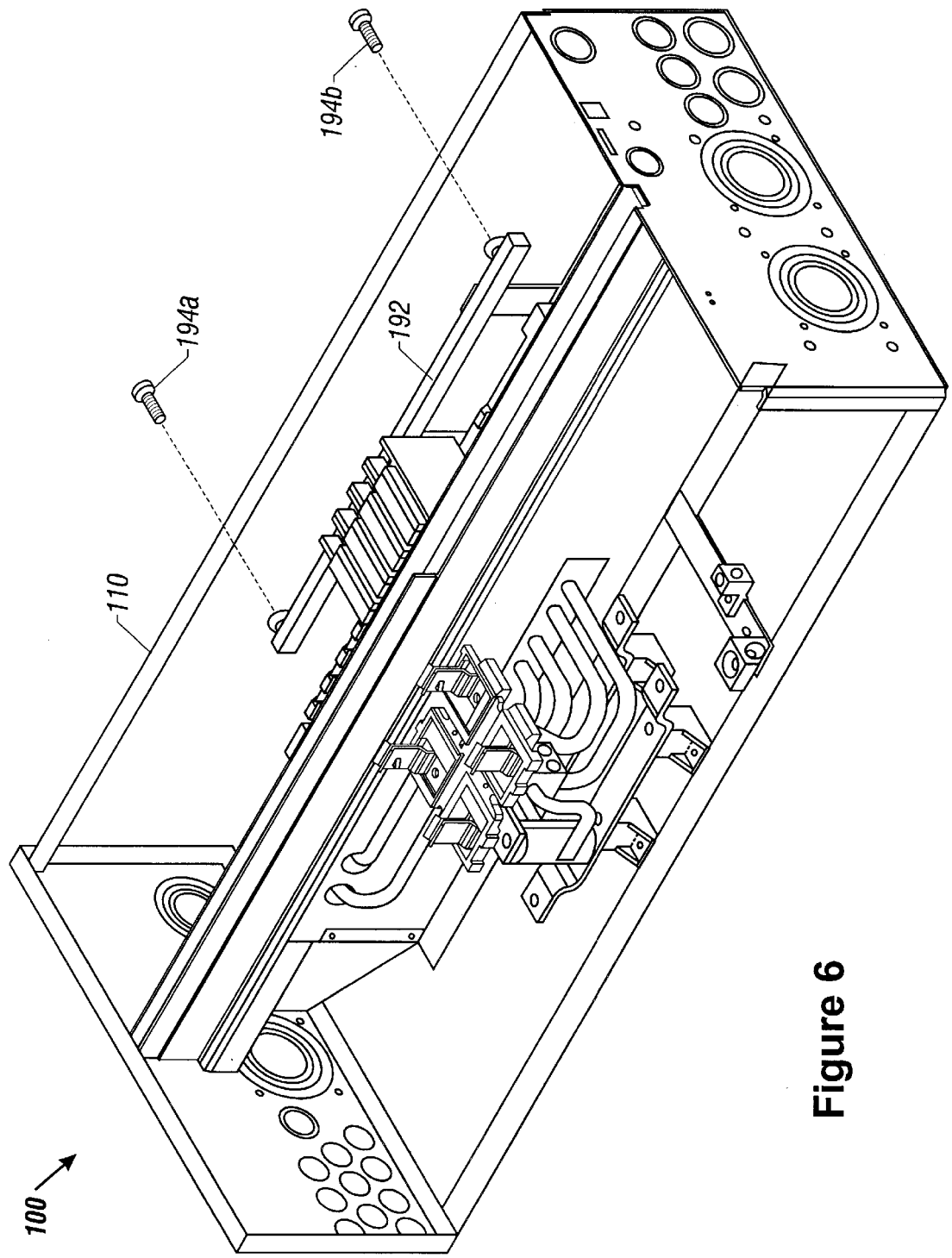
FIG. 6 shows an isometric view of the combination service entrance device with the branch neutral placed inside the panel board section according to the present invention.

FIG.6 shows the placement of a branch neutral inside the circuit breaker section. The branch neutral provides a common neutral for the circuit breakers. The branch neutral is placed elevated from the back panel and spaced from and along the length of the mounting pan 150. The branch neutral 192 may be conveniently attached to the right side panel(not shown) by suitable means, such as screws 194a and 194b. The elevation of the branch neutral 192 is chosen so as to allow easy connection of wires between the circuit breakers and the branch neutral 192.

In the above-described configuration, the panel board 190 is placed elevated a desired distance from the back panel 112 by means of a pair of interlocking tabs formed in the panel board mounting pan 150 into their corresponding lances formed in the center barrier 120 and a pair of vertical posts attached to between the panel board mounting pan and the back panel 112 of the common enclosure. The branch neutral 192 is also elevated.

Thus, the present invention provides a combination service entrance device wherein the panel board is elevated a desired distance from the back panel of the common enclosure so as to provide sufficient space for running wires between the panel board and the enclosure. Relatively easy connection means are provided for installing in and removing the panel board from the enclosure. An elevated neutral bar is installed along the panel board for connecting conductors between the circuit breakers and a common neutral connection. Compared to the prior devices, the combination service entrance device of the present invention: (a) provides greater space under the panel board for routing wires compared to the prior art units; (b) provides installers with easier access to the load connections of the circuit breakers and neutral; (c) saves installation time and reduces the chance of scraping hands during pulling of wires underneath the panel board; (d) allows routing of wires away from electrically live parts; (e) provides easier means for installing and removing the panel board; and (f) provides better air circulation underneath the panel board.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An electrical power distribution device, comprising:
   (a) an enclosure having a back panel; and
   (b) a barrier placed within the enclosure, said barrier dividing the enclosure into a first section for housing therein a utility meter socket and a second section for housing therein a panel board assembly, said panel board assembly having:
      (i) a mounting pan placed within the second section at a distance from the back panel to form a space between the pan and the back panel for accomodating conductors; and
      (ii) a panel board having provisions for mounting thereon a plurality of circuit breakers placed on the mounting pan.

2. The electrical power distribution device as specified in claim 1, wherein the distance between the back panel and the mounting pan is at least one inch.

3. The electrical power distribution device as specified in claim 1, wherein the mounting pan is separated from the back panel by a support member, the support member defining the distance between the mounting pan and the back panel.

4. The electrical power distribution device as specified in claim 1, further having provisions at the back panel for surface mounting the enclosure on a wall.

5. The electrical power distribution device as specified in claim 1, further having provisions for semi-flush-mounting the enclosure on a wall.

6. The electric power distribution device as specified in claim 1 further having a bracket in the first section for mounting a utility meter.

7. The electric power distribution unit as specified in claim 6 further having an opening in the barrier and a plurality of conductors between the bracket and the panel board.

8. The electric power distribution unit as specified in claim 7 wherein at least some of the conductors lie in the space between the pan and the back panel.

9. An electrical power distribution device, comprising:
   (a) an enclosure having a back panel; and
   (b) a barrier, having a lance, placed within the enclosure for dividing the enclosure into a first section for housing therein a utility-meter-socket and a second section for housing therein a panel board assembly, said panel board assembly having:
      a mounting pan having a substantially flat surface, a first side and a second side, the first side of the mounting pan coupled to the barrier by a tab placed in the lance, said mounting pan further attached to the back panel by a member which defines the desired distance between the mounting pan and the back panel.

10. An electrical power distribution device, comprising:
   (a) an enclosure having a back panel;
   (b) a barrier placed within the enclosure for dividing the enclosure into a first section for housing therein a utility meter socket and a second section for housing therein a panel board assembly, said panel board assembly having:
      (i) a mounting pan placed within the second section at a first distance from the back panel to form a space between the pan and the back panel for accomodating conductors; and
      (ii) a panel board having provisions for mounting thereon a plurality of circuit breakers placed on the mounting pan; and
   (c) a neutral bar placed within the second section for connecting electrical conductors between the circuit breakers and the neutral bar, the neutral bar being separated a second distance from the back panel.

11. An electrical power distribution device, comprising:

(a) an enclosure having a back panel;

(b) a barrier in the enclosure, said barrier dividing the enclosure into a first section and a second section, said barrier having a first attachment element;

(c) a panel board assembly in the second section, said panel board assembly having a second attachment element engaged with the first attachment element for coupling the panel board with the barrier; and (d) a support member placed between the panel board and the back panel for defining a space between the panel board and the back panel for accommodating conductors therein.

12. The electric power distribution device as specified in claim 11, the panel board assembly having a pan with a substantially flat surface at the second attachment element.

13. The electric power distribution device as specified in claim 12, the panel board assembly having a panel board with provision for accomodating a plurality of circuit breakers.

14. The electric power distribution device as specified in claim 11 further comprising a neutral bar placed within the second section, the neutral bar being separated a second distance from the back panel.

15. The electric power distribution device as specified in claim 13 further comprising a utility meter socket in the first section.

16. The electric power distribution device as specified in claim 11 wherein the first attachment element is a lance and the second attachment element is a tab.

* * * * *